(12) United States Patent
Zheng et al.

(10) Patent No.: US 11,264,931 B2
(45) Date of Patent: Mar. 1, 2022

(54) VIBRATION CONTROLLING METHOD FOR VIBRATOR, CONTROL DEVICE AND COMPUTER READABLE STORAGE MEDIUM

(71) Applicant: AAC Technologies Pte. Ltd., Singapore (SG)

(72) Inventors: Yajun Zheng, Shenzhen (CN); Zheng Xiang, Shenzhen (CN); Chengyan Sang, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 51 days.

(21) Appl. No.: 16/992,123

(22) Filed: Aug. 13, 2020

(65) Prior Publication Data

US 2020/0403545 A1      Dec. 24, 2020

Related U.S. Application Data

(63) Continuation of application No. PCT/CN2019/093249, filed on Jun. 27, 2019.

(30) Foreign Application Priority Data

Jun. 24, 2019 (CN) .......................... 201910549298.4

(51) Int. Cl.
*H02P 25/032* (2016.01)

(52) U.S. Cl.
CPC ................. *H02P 25/032* (2016.02)

(58) Field of Classification Search
CPC ...................................................... H02P 25/032
See application file for complete search history.

(56) References Cited

U.S. PATENT DOCUMENTS

| | | | |
|---|---|---|---|
| 5,857,986 A * | 1/1999 | Moriyasu | G09B 9/02 601/49 |
| 9,146,109 B2 * | 9/2015 | Magnoni | G01C 19/56 |
| 2009/0084180 A1 * | 4/2009 | Yoshida | G01F 1/8422 73/504.02 |
| 2010/0244967 A1 * | 9/2010 | Watanabe | H03B 5/364 331/17 |
| 2017/0338762 A1 * | 11/2017 | Hu | G05D 19/02 |
| 2018/0026571 A1 * | 1/2018 | Ge | H02P 25/062 318/135 |

* cited by examiner

*Primary Examiner* — Rina I Duda
(74) *Attorney, Agent, or Firm* — W&G Law Group

(57) ABSTRACT

The invention provides a vibration controlling method which amplifies a steady state voltage and generates a first voltage signal for controlling the vibrator to accelerate vibration to a target vibration amplitude lower than the steady state vibration amplitude, and then attenuates the startup voltage to the steady state voltage to generate a second voltage signal for controlling the vibrator to vibrate from the target vibration amplitude to the steady state vibration amplitude. Through the implementation of the invention, the steady state voltage is amplified and used as an excitation voltage of the acceleration section of vibrator vibration, and then it steadily decreases to the steady state voltage, which effectively shortens the acceleration time for the early stage of the vibrator vibration response and reduces the hysteresis of the vibrator vibration fed back to the user.

9 Claims, 7 Drawing Sheets

Vibration controlling device obtaining module
901 first generation module
902 second generation module
903 third generation module
904 control module
905

Fig. 9

VIBRATION CONTROLLING METHOD FOR VIBRATOR, CONTROL DEVICE AND COMPUTER READABLE STORAGE MEDIUM

FIELD OF THE PRESENT DISCLOSURE

The present disclosure relates to the technical field of electronic equipment, in particular to a vibrator vibration controlling method, a device and a computer readable storage medium.

DESCRIPTION OF RELATED ART

With the rapid development of science and technology, various types of electronic terminals are widely used in the daily life and work of users. In order to improve the user experience, R&D personnel in various fields are also constantly pursuing the improvement on product performance. Vibration feedback as a typical application of the terminals is a factor that cannot be ignored for improving the user experience of the terminals.

Vibration feedback is performed based on the vibrator vibration in the excitation signal terminals. At present, the vibrator vibration in the related arts is usually excited with a steady state voltage signal of a specific cycle. The vibrator undergoes an acceleration process in the early stage of the vibration response to reach steady state vibration from the stationary state, and then continue to stabilize the steady-state movement after reaching the steady state vibration until the end of the signal cycle, so that a certain buffering process exists in the early vibration response of the vibrator in this case, which brings about great hysteresis to users, which badly affects the user's experience and satisfaction.

Therefore, it is necessary to provide an improved vibration control mechanism to shorten the initial acceleration time of the vibrator vibration response, thereby improving the hysteresis of the user's perception of vibration.

SUMMARY OF THE PRESENT INVENTION

One of the primary objects of the present invention is to provide a vibration controlling method which effectively shortens the acceleration time for the early stage of the vibrator vibration response and reduces the hysteresis of the vibrator vibration fed back to the users.

To achieve the object mentioned above, the invention provides a vibration controlling method for a vibrator, comprising steps of:

obtaining an initial voltage signal for continuously outputting a steady state voltage within an effect duration;

amplifying the steady state voltage as a startup voltage according to a preset fixed amplification factor which is more than one;

generating a first voltage signal based on the startup voltage for controlling the vibrator to accelerate vibration to a target vibration amplitude lower than a steady state vibration amplitude attenuating the startup voltage to the steady state voltage based on a function with a monotone decreasing interval to generate a second voltage signal for controlling the vibrator to vibrate from the target vibration amplitude to the steady state vibration amplitude;

generating a steady state voltage signal based on the steady state voltage of preset continuance duration for controlling the vibrator to maintain vibration with a steady state vibration amplitude, the sum of effect duration of the first voltage signal, the second voltage signal, and the steady state voltage signal being equal to the effect duration of the initial voltage signal; and generating a target voltage signal based on the first voltage signal, the second voltage signal, and the steady state voltage signal for controlling the vibrator to vibrate according to the target voltage signal.

Further, the vibration controlling method further includes steps of:

after generating the steady state voltage signal based on the steady state voltage of the preset continuance duration, determining a brake voltage based on the function with a monotone decreasing interval;

generating a third voltage signal based on the brake voltage for controlling the vibrator to decrease from the steady state vibration amplitude to zero, a direction of the brake voltage being opposite to a direction of the steady state voltage; wherein the target voltage signal is generated based on the first voltage signal, the second voltage signal, the steady state voltage signal, and the third voltage signal.

Further, the step of determining the brake voltage based on the function with a monotone decreasing interval includes:

obtaining a resonance frequency of the vibrator;

determining the brake voltage whose frequency is equal to the resonance frequency of the vibrator based on the function with the monotone decreasing interval.

Further, the step of obtaining the resonance frequency of the vibrator includes:

driving the vibrator to vibrate by a preset frequency sweep signal;

collecting the vibration amount and voltage of the vibrator at different frequencies of the frequency sweep signal;

based on the calculation formula of the response value: dB=20 log(a/v), calculating the response values at the different frequencies respectively; where, a is the collected vibration amount, and v is the collected voltage; wherein the frequency corresponding to the maximum response value is determined as the resonance frequency of the vibrator.

Further, the vibration controlling method includes steps of:

before determination of the brake voltage based on the function with the monotone decreasing interval, generating a voltage stop signal of the preset effect duration; the voltage stop signal for controlling the vibration within the preset effect duration, the voltage output being zero; wherein the step of generating the target voltage signal based on the first voltage signal, the second voltage signal, the steady state voltage signal, and the third voltage signal includes a step of:

splicing the first voltage signal, the second voltage signal, the steady state voltage signal, the voltage stop signal, and the third voltage signal sequentially to generate a target voltage signal.

Further, the effect duration of the voltage stop signal is determined according to the resonance frequency of the vibrator.

Further, when the effect duration of the initial voltage signal is an integer multiple of 0.5, and the effect duration of the voltage stop signal is expressed as: ts=0.5/f0, wherein the f0 is the resonance frequency of the vibrator;

when the effect duration of the initial voltage signal is not an integer multiple of 0.5, the effect duration of the voltage stop signal is expressed as: ts s=(tg+0.5)/f0; wherein, the tg is the effect duration of the initial voltage signal is divided by 0.5 decimal places, and the f0 is the resonance frequency of the vibrator.

The invention further provides a control device, including:

an obtaining module for obtaining an initial voltage signal for continuously outputting a steady state voltage within the effect duration of signal;

a first generation module for amplifying the steady state voltage as a startup voltage according to a preset fixed amplification factor and generating the a voltage signal according to the startup voltage for controlling the vibrator to accelerate vibration to a target vibration amplitude lower than the steady state vibration amplitude; the value of the fixed amplification factor being more than 1;

a second generation module for attenuating the startup voltage to the steady state voltage based on the function with the monotone decreasing interval, and generating a second voltage signal for controlling the vibrator from the target vibration amplitude vibration to the steady state vibration amplitude;

a third generation module for generating the steady state voltage signal based on the steady state voltage of a preset continuance duration for controlling the vibrator to maintain vibration with the steady state vibration amplitude, a sum of the effect duration of the first voltage signal, the second voltage signal and the steady state voltage signal being equal to the effect duration of the initial voltage signal;

a control module for generating a target voltage signal based on the first voltage signal, the second voltage signal and the steady state voltage signal.

The present invention further provides an electronic device, comprising: a memory, a processor, and a computer program stored on the memory and running on the processor when the processor executes the computer program for implements the steps described above.

The present invention further provides a computer readable storage medium in which a computer program is stored, wherein the computer program is executed by a processor for implementing the steps described above.

Compared with the related arts, the vibrator vibration control device provided by the embodiments amplifies the steady state voltage and generates the first voltage signal for controlling the vibrator acceleration vibration to the target vibration amplitude lower than the steady state vibration amplitude. The startup voltage is attenuated to the steady state voltage to generate the second voltage signal for controlling the vibration of the vibrator from the target vibration amplitude to the steady state vibration amplitude. The steady state voltage signal for controlling the steady state vibration of vibrator is generated based on the steady state voltage of the preset continuance duration. Finally, the vibrator vibration is controlled by the target voltage signal generated by the first voltage signal, the second voltage signal, and the steady state voltage signal. Through the implementation of the invention, the steady state voltage is amplified and used as the excitation voltage of the acceleration section of vibrator vibration for decreasing to the steady state voltage, which effectively shortens the acceleration time for the early stage of the vibrator vibration response and reduces the hysteresis of the vibrator vibration fed back to the users.

BRIEF DESCRIPTION OF THE DRAWINGS

Many aspects of the exemplary embodiments can be better understood with reference to the following drawings. The components in the drawing are not necessarily drawn to scale, the emphasis instead being placed upon clearly illustrating the principles of the present disclosure.

FIG. 9 is a schematic view of a program module of a vibration control device provided by a third embodiment of the invention;

DETAILED DESCRIPTION OF THE EXEMPLARY EMBODIMENTS

The present disclosure will hereinafter be described in detail with reference to several exemplary embodiments. To make the technical problems to be solved, technical solutions and beneficial effects of the present disclosure more apparent, the present disclosure is described in further detail together with the figures and the embodiments. It should be understood the specific embodiments described hereby are only to explain the disclosure, not intended to limit the disclosure.

Figure 1:
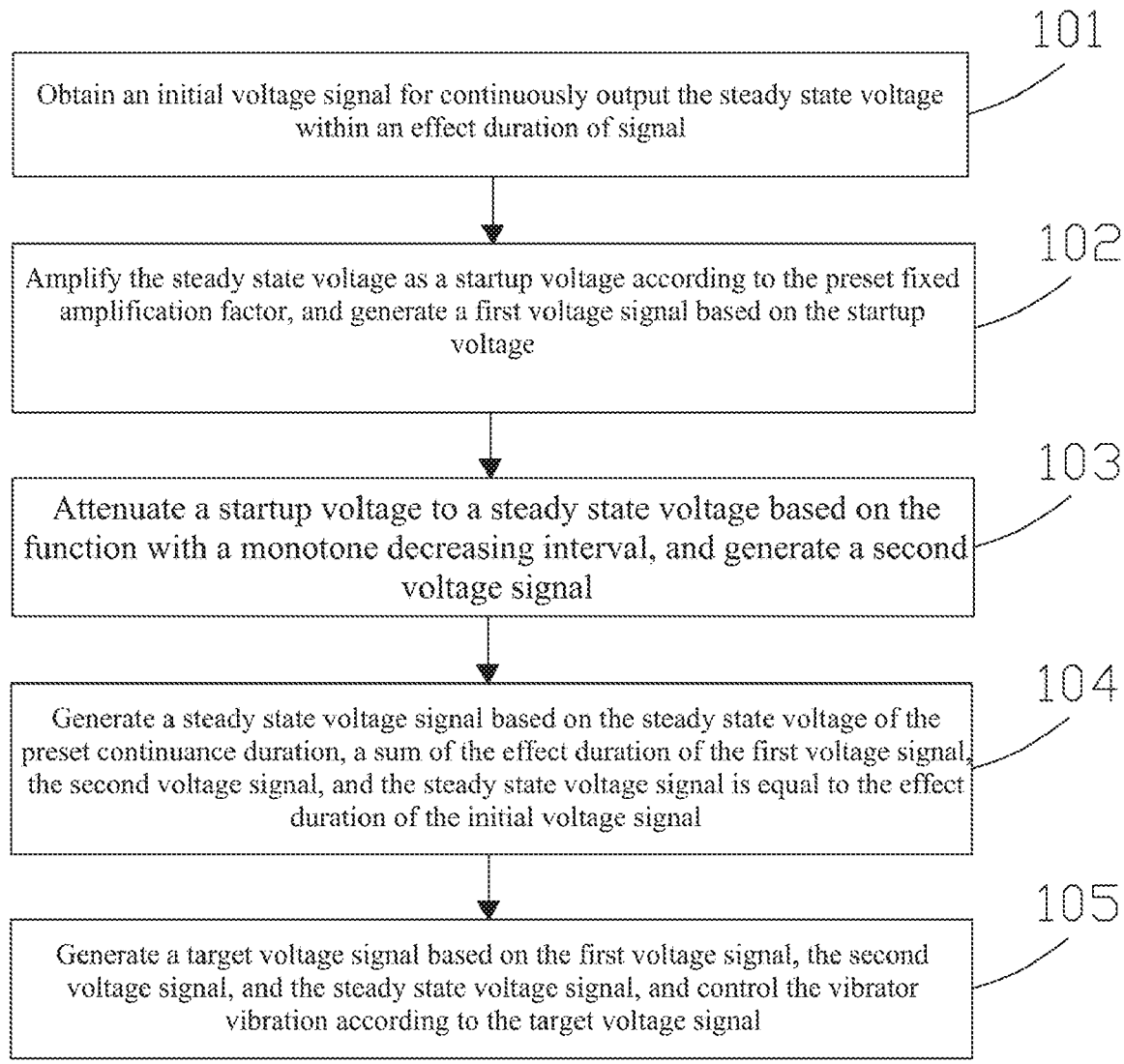
FIG. 1 is a flow chart of a vibration controlling method for a vibrator.

In order to solve the problems in the related arts that the early vibration response of the vibrator has a certain buffering process when the vibration is excited with a certain cycle of steady state voltage signal, and the user feels that the hysteresis of the vibration is relatively large, a first embodiment of the invention discloses a vibration controlling method for a vibrator. FIG. 1 shows a flow chart of the vibration controlling method provided by the embodiment. The vibration controlling method includes the following steps:

Step 101: Obtain an initial voltage signal. The initial voltage signal is used to continuously output the steady state voltage within an effect duration of signal.

Figure 2:
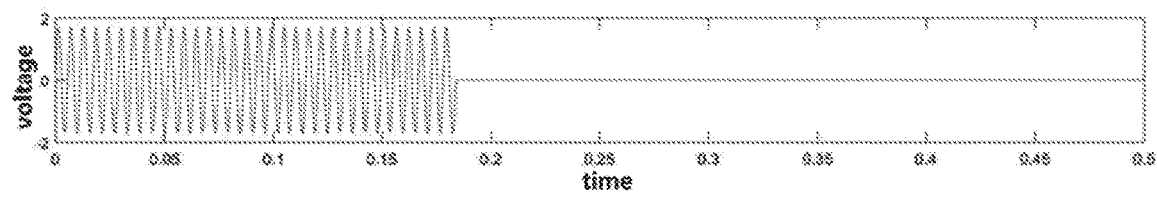
FIG. 2 is a schematic view of an initial voltage signal provided by a first embodiment of the invention.

As shown in FIG. 2, the initial voltage signal provided in the embodiment, also the voltage signal used in the current related arts, continuously outputs the steady state voltage throughout the effect duration of signal, so that when the vibrator is driven by the voltage signal, a relatively slow acceleration process exists in the initial stage of the vibrator response, from the stationary state to the steady state vibration, which causes vibration hysteresis in the actual applications, based on which the signal is optimized according to the initial voltage signal in this embodiment, with a view to improving the vibrator vibration hysteresis. It should be understood that the vibrator in this embodiment includes, but is not limited to, a functional module installed in a terminal and used to perform ringing vibration, touch feedback, game shock, and warning reminder.

Be noted that in practical applications, the initial voltage signal, including but not limited to sinusoidal signals, can be generated according to the time length requirements, frequency requirements, and strength requirements of the vibration sensation fed back by the vibrator vibration in combination with the structural characteristics of the vibrator. The parameters of the initial voltage signals include: frequency $f_1$ amplitude $V_1$ cycle number $N_1$. Of course, the above-mentioned vibration sensation requirements should be within the range that the vibrator can achieve.

Step 102: Amplify the steady state voltage as a startup voltage according to the preset fixed amplification factor, and generate a first voltage signal based on the startup voltage. The first voltage signal is used to control the acceleration vibration of the vibrator to the target vibration amplitude lower than the steady state vibration amplitude. The value of the fixed amplification factor is more than 1.

Specifically, in order to improve the acceleration time at the initial stage of the vibrator response, the initial voltage is amplified by a certain amplification factor in the embodiment to generate the first voltage signal. When the vibrator is under control of this signal, the driving force is enhanced and the acceleration time is shortened. In this embodiment, based on the initial voltage signal, the initial part with the duration $t_a$ is subjected to voltage amplification with a fixed amplification factor $\mu_1$ ($\mu_1 > 1$). Here, the vibration intensity requirements after the signal optimization ends is close to but does not exceed the vibration intensity requirements of the vibration sensation. The voltage signal after the section of optimization is represented as the first voltage signal. It should be understood that when the target vibration amount is fixed, if the voltage is achievable, the larger $\mu_1$ is, the shorter the duration $t_a$ of the required startup voltage gets. Thus, the time is shortened to drive the vibrator for reaching the steady state vibration.

Step 103: Attenuate a startup voltage to a steady state voltage based on the function with a monotone decreasing interval, and generate a second voltage signal. The second voltage signal is used to control the vibration of the vibrator from the target vibration amplitude to the steady state vibration amplitude.

Specifically, because the first voltage amplifies the initial voltage by $u_1$ times, the vibration intensity is already close to the required steady state vibration intensity. At this time, it is only necessary to reduce the voltage to the steady state voltage. In this embodiment, in order to avoid abrupt changes in voltage, the voltage buffer area with the duration of $t_d$ is set, and the voltage amplitude of this area is attenuated from $\mu_1 V_1$ to $V_1$; the optimized voltage signal of this section is expressed as the second voltage signal, to ensure that the vibrator reaches the steady state vibration amplitude smoothly after the vibration is accelerated to a certain amplitude when the vibrator is under control of the voltage signal of this section. Many types of attenuation can perform in this embodiment, as long as the voltage attenuation behavior (that is, voltage envelope) is related to the function with a monotone decreasing interval. In principle, the smaller the $t_d$ is, the faster the steady state vibration strength is reached, but if the $t_d$ is too small and the voltage slope at the junction is too high, the high-frequency component of the signal is obvious, which excites the high-order mode of the vibrator and generate noise. Therefore, $t_d$ should not be too small. The critical value varies according to the structural characteristics of the vibrator.

It should be noted that the functions with the monotone decreasing interval in this embodiment include, but are not limited to, any one of the following: linear function, multiple function, power function, exponential function, logarithmic function, triangular function, and inverse triangular function.

Step 104: Generate a steady state voltage signal based on the steady state voltage of the preset continuance duration. The steady state voltage signal is used to control the vibrator to maintain vibration with the steady state vibration amplitude, and the sum of the effect duration of the first voltage signal, the second voltage signal, and the steady state voltage signal is equal to the effect duration of the initial voltage signal.

Specifically, after the vibrator reaches the steady state vibration amplitude in this embodiment, a section of steady state voltage signal is generated following the second voltage signal, and a section of steady state voltage is continuously output based on the signal to control the vibrator to maintain steady state vibration before the vibrator is in stable vibration for a preset duration.

Step 105: Generate a target voltage signal based on the first voltage signal, the second voltage signal, and the steady state voltage signal, and control the vibrator vibration according to the target voltage signal.

Figure 3:
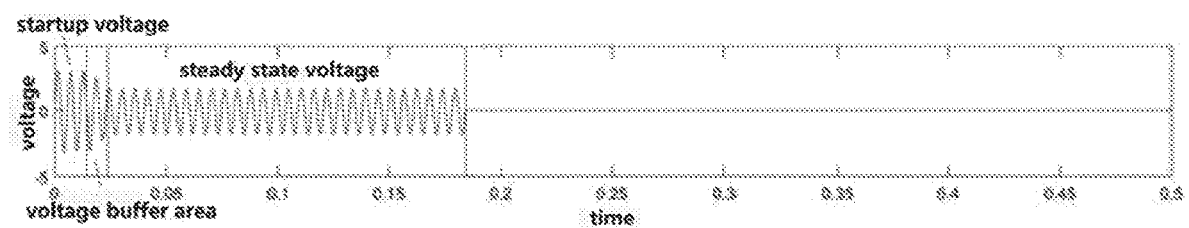
FIG. 3 is a schematic view of a target voltage signal provided by the first embodiment of the invention.

The schematic view of the target voltage signal provided in the embodiment is shown in FIG. 3. The target voltage signal generated by optimizing the initial voltage signal includes three sections, which are sequentially spliced by the first voltage signal, the second voltage signal and the steady state voltage signal in this embodiment. Wherein the first voltage signal in the front section outputs the amplified startup voltage, and the second voltage signal in the middle section is the voltage buffer area, which is buffered from the startup voltage to the steady state voltage. The steady state voltage signal in the latter section is used to continuously output the steady state voltage. The steady state vibration can be quickly achieved by appropriately adjusting the excitation voltage in acceleration section. In an enforcement mode of the embodiment, if the excitation signal stops immediately after the steady state voltage signal ends, the vibrator suffers from free attenuated vibration under the damping effect until it stops.

Optionally, after generating the steady state voltage signal based on the steady state voltage of the preset continuance duration, the method further includes: determining a brake voltage based on the function with a monotone decreasing interval; generating the third voltage signal based on the brake voltage; and the third voltage signal is used to control the steady state vibration amplitude of the vibrator drops to zero, and the direction of brake voltage is opposite to the direction of steady state voltage.

In practical applications, if the vibrator is allowed to be subjected to freely attenuated vibration under the damping effect after its positive excitation signal is stopped, a certain time delay is required before the vibrator is stationary, which thus causes a certain vibration hysteresis in the late stage of the vibrator vibration feedback. In another enforcement mode of this embodiment, after the steady state voltage signal in the positive excitation signal ends, a monotonically decreasing reverse voltage signal (braking signal) or the third voltage signal, is also generated. The sign of the section signal is opposite to the sign of the positive excitation signal before the stop. This voltage signal is used to drive the vibrator reversely, prompting the vibrator to reach a stationary state faster than the freely attenuated vibration. Correspondingly, in this embodiment, the first voltage signal, the second voltage signal, the steady state voltage signal and the third voltage signal are sequentially spliced to generate the final target voltage signal.

Further, in some enforcement modes of this embodiment, determining the brake voltage based on the function with a monotone decreasing interval includes: obtaining the resonance frequency of the vibrator, and determining the brake voltage with a frequency equal to the resonance frequency of the vibrator based on the function with monotone decreasing interval. The frequency of the brake voltage stays consistent with the resonance frequency of the vibrator. It should be noted that the envelope is a voltage signal with the steady state voltage monotonically decreasing from $V_0$ to 0 and the duration $t_0$ (the descending form can refer to that of the second voltage signal). Within the allowable range of voltage, the larger $V_0$ and the smaller $t_0$, the effect of quickly braking the vibrator can be achieved.

Optionally, obtaining the resonance frequency of the vibrator includes: driving the vibrator vibration through the preset frequency sweep signal; collecting the vibration amount and voltage of the vibrator at different frequencies of the frequency sweep signal. Based on the response value calculation formula: dB=20 log(a/v), calculating the response values at different frequencies, wherein, a is the collected vibration amount and v is the collected voltage. The frequency corresponding to the maximum response value is determined according to the resonance frequency of the vibrator.

Figure 4:
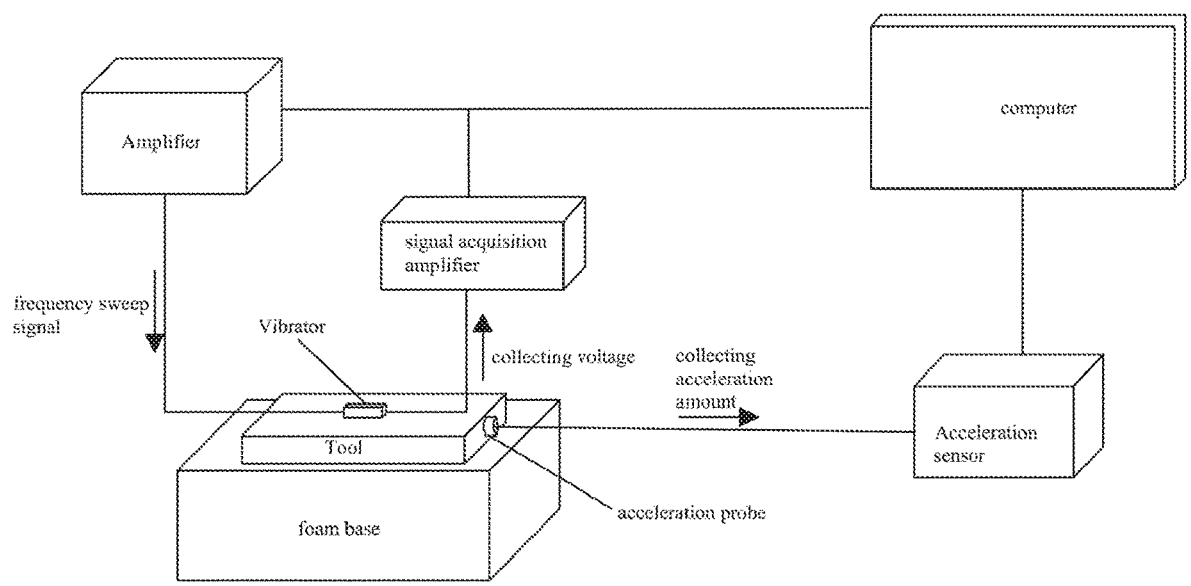
FIG. 4 is an illustration view of a resonance frequency detection system provided by the first embodiment of the invention.

Specifically, FIG. 4 shows a structural schematic view of a resonance frequency detection system provided by the embodiment. In this embodiment, the vibrator can be placed on the tooling above a foam base, and the tooling is electrically connected to an acceleration probe of the acceleration sensor. A frequency sweep signal (such as a step frequency sweep signal) is sent through a computer-controlled power amplifier to excite the vibrator vibration. The frequency of the frequency sweep signal changes linearly with time, then the acceleration amount a is collected through the acceleration sensor, and the voltage v is collected through the signal acquisition amplifier at the same time. The collected data is processed by computer, and the response values at different frequencies are calculated according to the formula dB=20 log(a/v). The frequency with the largest response value is its resonance frequency.

Optionally, before determining the brake voltage based on the function with a monotone decreasing interval, it further includes steps of: generating a voltage stop signal of the preset effect duration. The voltage stop signal is used to control within the preset effect duration, and the voltage output is zero.

In practical applications, if the third voltage signal used to output the brake voltage is directly applied after the steady state voltage signal comes to an end, a voltage leap occurs. Thus, in another enforcement mode of this embodiment, a voltage stop signal is also provided between the steady state voltage signal and the third voltage signal. In the effect duration of signal, i.e., the rest interval of the voltage, the voltage output is zero, which provides space for reversing the voltage. Correspondingly, in this embodiment, the first voltage signal, the second voltage signal, the steady state voltage signal, the voltage stop signal, and the third voltage signal are sequentially spliced to generate the final target voltage signal.

It should be noted that, in an enforcement mode of the embodiment, the effect duration of the voltage stop signal is determined based on the resonance frequency of the vibrator. Further, when the effect duration of the initial voltage signal is an integer multiple of 0.5, the effect duration of the voltage stop signal is expressed as: $t_s=0.5/f_0$, where $f_0$ is the resonance frequency of the vibrator. When the effect duration of the initial voltage signal is an integer multiple of not 0.5, the effect duration of the voltage stop signal is expressed as: is $=(t_g+0.5)/f_0$; wherein, $t_g$ is the fraction of the effect duration of the initial voltage signal divided by 0.5, and $f_0$ is the resonance frequency of the vibrator.

Figure 5:
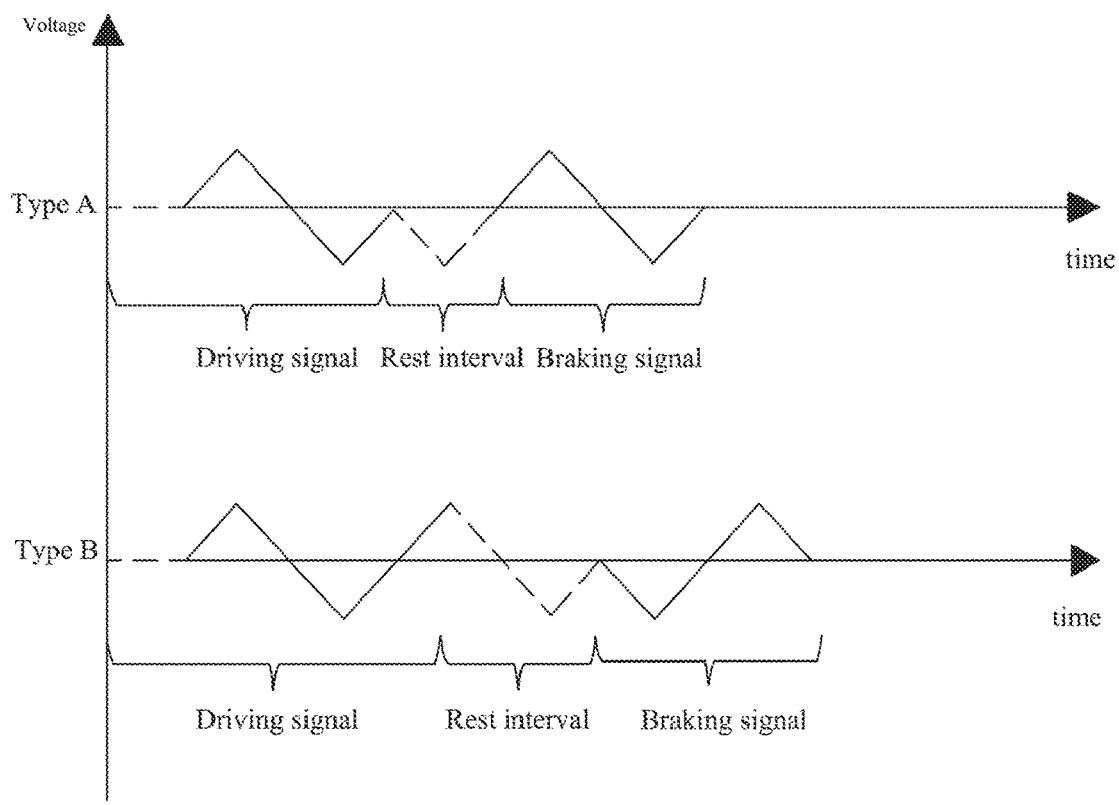
FIG. 5 is a schematic view of a configuration of a rest interval provided by the first embodiment of the invention.

Specifically, the voltage stop signal in this embodiment can be classified into two types. Wherein, for type A, if the effect duration of the initial voltage signal N1 is an integer multiple of 0.5, the voltage stops at the rest interval (Duration $t_s=0.5/f_0$) after the forward driving signal ends, and then the brake voltage is increased; for type B, if $N_1$ is not an integer multiple of 0.5, the duration of the rest interval should be ts=$(t_g+0.5)/f_0$, wherein $t_g$ is decimal place of $N_1/0.5$. Taking a triangle wave signal as an example, this embodiment provides a setup schematic view of the rest interval shown in FIG. 5.

Compared with the related arts, the vibrator vibration controlling method provided by this embodiment amplifies the steady state voltage and generates the first voltage signal for controlling the vibrator to accelerate vibration to a target vibration amplitude lower than the steady state vibration amplitude, and then the startup voltage is attenuated to the steady state voltage to generate the second voltage signal for controlling the vibration of the vibrator from the target vibration amplitude to the steady state vibration amplitude; then the steady state voltage signal for controlling the steady state vibration of vibrator is generated based on the steady state voltage of the preset continuance duration. Finally, the vibrator vibration is controlled by the target voltage signal generated by the first voltage signal, the second voltage signal, and the steady state voltage signal. Through the implementation of the invention, the steady state voltage is amplified and used as the excitation voltage of the acceleration section of vibrator vibration, and then steadily decreases to the steady state voltage, which effectively shortens the acceleration time for the early stage of the vibrator vibration response and reduces the feedback of the vibrator vibration to the user hysteresis.

Figure 6:
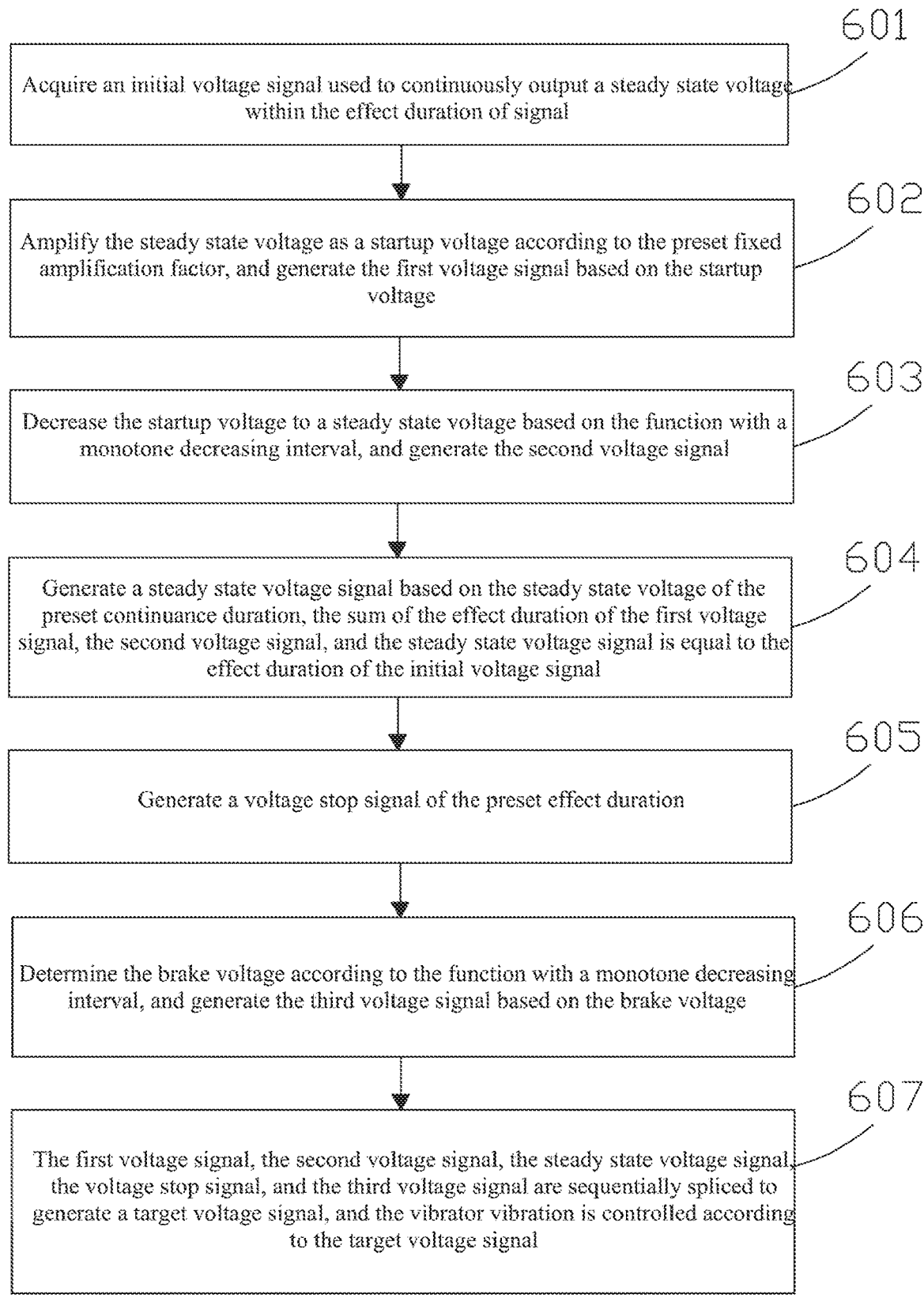
FIG. 6 is a flow chart of a refined vibration controlling method for a vibrator provided by a second embodiment of the invention.

In order to better understand the invention, the embodiment of the invention also discloses a refined vibrator vibration controlling method. The method in FIG. 6 is a refined vibrator vibration controlling method provided by the second embodiment of the invention. The vibrator vibration controlling method includes:

Step 601: Acquire an initial voltage signal; the initial voltage signal is used to continuously output a steady state voltage within the effect duration of signal.

Please refer also to FIG. 2. In this embodiment, the initial voltage signal continuously outputs a steady state voltage with a cycle of 1/f0 throughout the effect duration of signal, and f0 is the resonance frequency of the vibrator.

Step 602: Amplify the steady state voltage as a startup voltage according to the preset fixed amplification factor, and generate the first voltage signal based on the startup voltage. The first voltage signal is used to control the vibrator to accelerate vibration to a target vibration amplitude lower than the steady state vibration amplitude. The value of the fixed amplification factor is more than 1.

Based on the initial voltage signal in this embodiment, the initial part with the duration to is subjected to voltage amplification with a fixed amplification factor $\mu_1$ ($\mu_1>1$). Here, the vibration intensity after the end of the signal optimization is close to but does not exceed the vibration intensity requirement of the vibration sensation. The voltage signal after the section optimization is represented as the first voltage signal.

Step 603: Decrease the startup voltage to a steady state voltage based on the function with a monotone decreasing interval, and generate the second voltage signal. The second voltage signal is used to control the vibrator to vibrate from the target vibration amplitude to the steady state vibration amplitude.

The voltage buffer area with a duration of $t_d$ is set in this embodiment. The voltage amplitude in this area is attenuated from $\mu_1 V_1$ to $V_1$. The optimized voltage signal in this area is expressed as the second voltage signal to ensure that the vibrator can smoothly reach the steady state vibration amplitude after its vibration is accelerating to a certain amplitude when the vibrator is under control of this section of voltage signal.

Step 604: Generate a steady state voltage signal based on the steady state voltage of the preset continuance duration. The steady state voltage signal is used to control the vibrator to maintain vibration with the steady state vibration amplitude, and the sum of the effect duration of the first voltage signal, the second voltage signal, and the steady state voltage signal is equal to the effect duration of the initial voltage signal.

Specifically, in this embodiment, a steady state voltage is continuously output based on the steady state voltage signal after the second voltage signal, to control the vibrator to maintain stable vibration for the preset duration after reaching the steady state vibration.

Step 605: Generate a voltage stop signal of the preset effect duration. The voltage stop signal is used to control within the preset effect duration, and the voltage output is zero.

Step 606: Determine the brake voltage according to the function with a monotone decreasing interval, and generate the third voltage signal based on the brake voltage. The third voltage signal is used to control the vibrator to decrease from the steady state vibration amplitude to zero. The direction of the brake voltage is opposite to the direction of the steady state voltage.

After the steady state voltage signal in the positive excitation signal of this embodiment is completed, a monotonically decreasing reverse voltage signal (brake voltage signal) is generated, which is also the third voltage signal. The sign of the signal is contrary to the sign of the positive excitation signal before stopping. This voltage signal is used to drive the vibrator reversely, causing the vibrator to reach a stationary state faster than the freely attenuated vibration. It should also be noted that a voltage stop signal between the steady state voltage signal and the third voltage signal is also set in this embodiment. In the effect duration of signal, or in the rest interval of voltage, the voltage output is zero, which provides space for reversing the voltage.

Step 607: The first voltage signal, the second voltage signal, the steady state voltage signal, the voltage stop signal, and the third voltage signal are sequentially spliced to generate a target voltage signal, and the vibrator vibration is controlled according to the target voltage signal.

Figure 7:
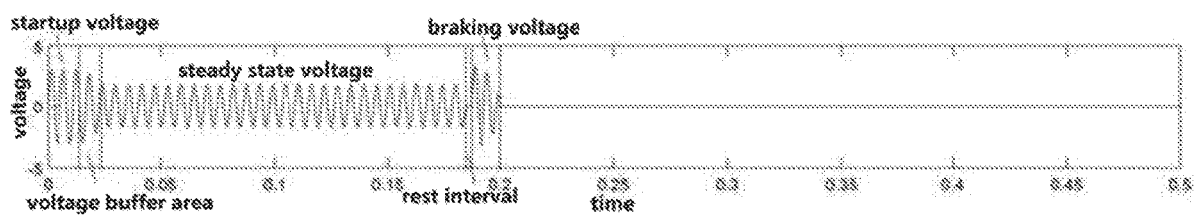
FIG. 7 is a schematic view of a target voltage signal provided by the second embodiment of the invention.

A schematic view of the target voltage signal provided by this embodiment is shown in FIG. 7. The target voltage signal generated after optimizing the initial voltage signal includes five sections, in which the first voltage signal in the first section outputs the amplified startup voltage, and the startup voltage in this embodiment is 1.8 times the steady state voltage. The second voltage signal in the second section is the voltage buffer area, and the buffer area in this embodiment uses a linear decreasing envelope, which buffers from the startup voltage to the steady state voltage. The steady state voltage signal in the third section is used to continuously output the steady state voltage, and the voltage stop signal in the fourth section is used to provide the rest interval. The rest interval of this embodiment is set to 0.5/f0, which provides space for reversing the voltage. The third voltage signal in the fifth section is used to output the brake voltage. The brake voltage of this embodiment is twice the steady state voltage, and the envelope is the exponential function decreasing to 0. The excitation vibrator is reversed to drive the vibrator to be still faster than the freely attenuated vibration.

Figure 8:
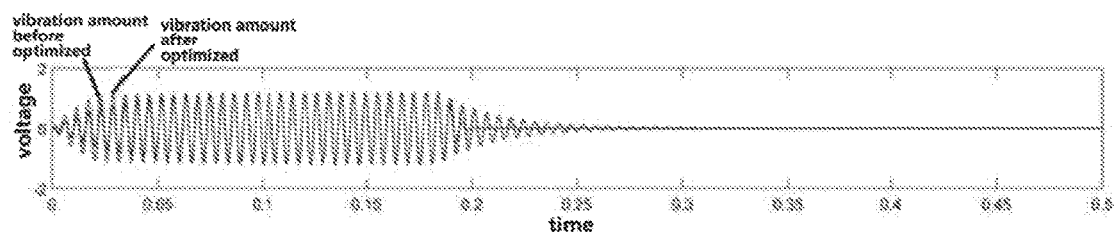
FIG. 8 is a comparison schematic view of the vibration amount of the vibrator before and after signal optimization in the second embodiment of the invention.

Compared with the related arts, this embodiment achieves rapid steady state vibration by appropriately adjusting the excitation voltage in acceleration section, and after the steady state voltage signal ends, the brake voltage is applied through the third voltage signal to zoom the voltage and promote the vibrator to stop vibrating quickly, so that the front and rear hysteresis fed back by the vibrator vibration have been greatly improved. A comparison schematic view of the vibration amount of vibrator before and after signal optimization provided by the embodiment is shown in FIG. 8. It is obvious from the figure that the steady state vibration amplitude (vibration acceleration) can be reached in advance with the optimized voltage signal, and the vibrator ringing after vibration can be quickly stopped.

FIG. 9 shows a vibrator vibration control device provided by a third embodiment in the invention. The vibrator vibration control device can be used to realize the vibrator vibration controlling method in the embodiment shown in FIG. 1 or FIG. 6. As shown in FIG. 9, the vibration controlling device mainly includes:

an obtaining module 901 for obtaining initial voltage signal. The initial voltage signal is used to continuously output steady state voltage within the effect duration of signal;

a first generation module 902 for amplifying the steady state voltage as a startup voltage according to the preset fixed amplification factor, and generate the first voltage signal based on the startup voltage. The first voltage signal is used to control the acceleration vibration of the vibrator to the target vibration amplitude lower than the steady state vibration amplitude. The value of the fixed amplification factor is more than 1;

a second generation module 903 is used to attenuate the startup voltage to a steady state voltage based on the function with a monotone decreasing interval, and generate the second voltage signal. The second voltage signal is used to control the vibration of the vibrator from the target vibration amplitude to the steady state vibration amplitude;

a third generation module 904 for generating a steady state voltage signal based on the steady state voltage of the preset continuance duration. The steady state voltage signal is used to control the vibrator to maintain vibration with the steady state vibration amplitude. The sum of the effect duration of the first voltage signal, the second voltage signal and the steady state the voltage signal is equal to the effect duration of the initial voltage signal;

a control module 905 for being used to generate the target voltage signal based on the first voltage signal, the second voltage signal and the steady state voltage signal, and to control the vibrator vibration according to the target voltage signal.

In an optional enforcement mode of this embodiment, the vibrator vibration control device further includes: a fourth generation module for determining a brake voltage based on the function with a monotone decreasing interval; and a third voltage signal generated based on the brake voltage used to control the vibrator to decrease from the steady state vibration amplitude to zero, wherein the direction of the brake voltage is opposite to the direction of the steady state voltage. Correspondingly, the control module 905 is specifically used to generate the target voltage signal according to the first voltage signal, the second voltage signal, the steady state voltage signal and the third voltage signal.

Further, the fourth generation module is specifically used to obtain the resonance frequency of the vibrator when determining the brake voltage based on the function with a monotone decreasing interval; determining the brake voltage with a frequency equal to the resonance frequency of the vibrator based on the function with a monotone decreasing interval.

Furthermore, the fourth generation module when acquiring the resonance frequency of the vibrator is specifically used to drive the vibrator vibration with a preset frequency sweep signal. At different frequencies of frequency sweep signal, the vibration amount and voltage of the vibrator are separately collected. Based on the calculation formula of response value: dB=20 log(a/v), the response values at different frequencies are respectively calculated, where, a is the collected vibration amount, and v is the collected voltage. The frequency corresponding to the maximum response value is determined as the resonance frequency of the vibrator.

In an optional enforcement mode of this embodiment, the vibrator vibration control device further comprises: a fourth generation module, used to generate a voltage stop signal of the preset effect duration before determining the brake voltage based on the function with a monotone decreasing interval. The voltage stop signal is used to control within the preset effect duration, and the voltage output is zero. Correspondingly, the control module 905 is specifically used to sequentially splice the first voltage signal, the second voltage signal, the steady state voltage signal, the voltage stop signal and the third voltage signal to generate the target voltage signal.

Further, the effect duration of the voltage stop signal is determined based on the resonance frequency of the vibrator.

Furthermore, when the effect duration of the initial voltage signal is an integer multiple of 0.5, the effect duration of the voltage stop signal is expressed as: $t_s=0.5/f0$, wherein f0 is the resonance frequency of the vibrator. When the effect duration of the initial voltage signal is not an integer multiple of 0.5, the effect duration of the voltage stop signal is expressed as: $t_s=(t_g+0.5)/f0$; wherein $t_g$ is the decimal place of the effect duration of the initial voltage signal divided by 0.5, and f0 is the resonance frequency of the vibrator.

It should be noted that the vibrator vibration controlling method in the first and second embodiments can be implemented based on the vibrator vibration control device provided by this embodiment, and ordinary technicians in the art can clearly understand that. For the convenience and conciseness of description, the specific working process of the vibrator vibration control device described in this embodiment can refer to the corresponding process in the foregoing method embodiment.

Compared with the related arts, the vibrator vibration control device provided by the embodiments amplifies the steady state voltage and generates the first voltage signal for controlling the vibrator acceleration vibration to the target vibration amplitude lower than the steady state vibration amplitude. The startup voltage is attenuated to the steady state voltage to generate the second voltage signal for controlling the vibration of the vibrator from the target vibration amplitude to the steady state vibration amplitude. The steady state voltage signal for controlling the steady state vibration of vibrator is generated based on the steady state voltage of the preset continuance duration. Finally, the vibrator vibration is controlled by the target voltage signal generated by the first voltage signal, the second voltage signal, and the steady state voltage signal. Through the implementation of the invention, the steady state voltage is amplified and used as the excitation voltage of the acceleration section of vibrator vibration for decreasing to the steady state voltage, which effectively shortens the acceleration time for the early stage of the vibrator vibration response and reduces the hysteresis of the vibrator vibration fed back to the users.

Figure 10:
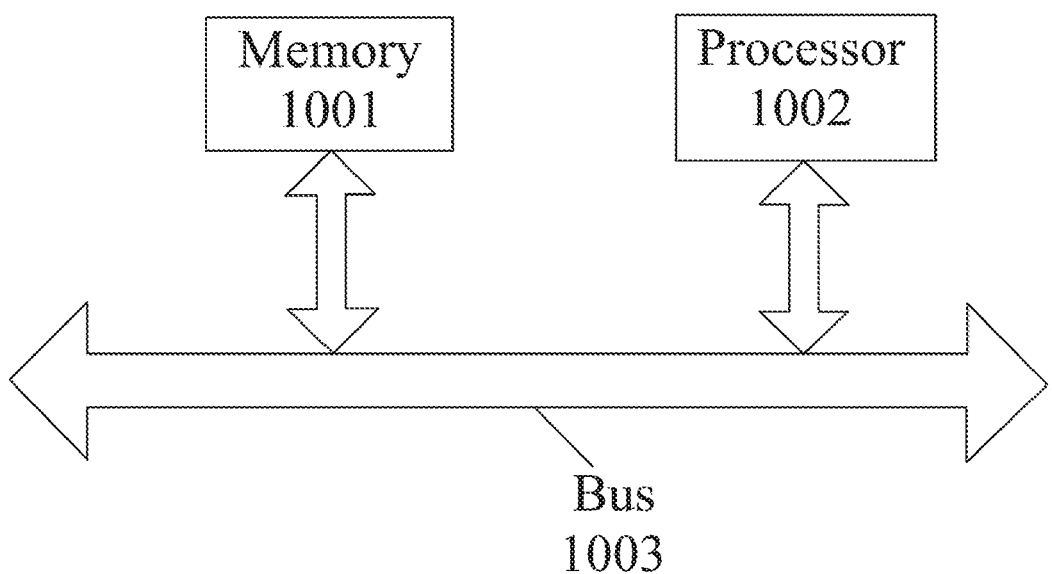
FIG. 10 is a structural schematic view of an electronic device provided by a fourth embodiment of the invention.

Please refer to FIG. 10, which shows an electronic device provided by the fourth embodiment of the invention. The electronic device can be used to implement the vibrator vibration controlling method in the embodiment shown in FIG. 1 and FIG. 6. As shown in FIG. 10, the electronic device mainly includes: a memory 1001, a processor 1002, a bus 1003, and a computer program stored on the memory 1001 and running on the processor 1002. The memory 1001 and the processor 1002 are connected through the bus 1003. When the processor 1002 executes the computer program, the vibrator vibration controlling method in the embodiments mentioned above is realized. Wherein, the number of processors may be one or more.

The memory 1001 may be a high-speed random access memory (RAM, Random Access Memory), or may be a non-volatile memory, such as a disk memory. The memory 1001 is used to store executable program codes, and the processor 1002 is coupled with the memory 1001.

Further, the invention also provides a computer readable storage medium. The computer readable storage medium may be provided in the electronic device in each embodiment above. The computer readable storage medium may be the memory in the embodiment shown in FIG. 10 and described above.

A computer program is stored on the computer readable storage medium, and when the program is executed by the processor, the vibrator vibration controlling method shown in FIG. 1 or FIG. 6 is realized. Further, the computer storage medium may also be a U disk, a mobile hard disk, a read-only memory (ROM, Read-Only Memory), RAM, a magnetic disk, or an optical disk and other media that can store program codes.

In the several embodiments provided by the invention, it should be understood that the disclosed device and method may be implemented in other ways. For example, the embodiment of device described above is only schematic. For instance, the division of modules is only a division of logical functions. In actual implementation, other divisions may exist; for example, multiple modules or components may be combined or integrated to another system, or some features can be ignored or not implemented. Additionally, the displayed or discussed mutual coupling or direct coupling or communication connection may be indirect coupling or communication connection through some interfaces, devices or modules, and may be in electrical, mechanical or other forms.

A module described as a separate component may or may not be physically separated, and a component displayed as a module may or may not be a physical module, that is, it may be located in one place, or may be distributed on multiple network modules. Part or all of the modules can be selected according to actual needs to achieve the purpose of this embodiment scheme.

In addition, each functional module in each embodiment of the invention may be integrated into one processing module, or each module may exist alone physically, or two or more modules may be integrated into one module. The integrated modules above can be implemented in the form of hardware or software functional module.

If the integrated module is implemented in the form of a software functional module and sold or used as an independent product, it can be stored in a computer-readable storage medium. Based on this understanding, essentially, the technical solution of the invention or part of the contribution to the prior arts or all or part of the technical solution can be embodied in the form of a software product. The computer software product is stored in a readable storage medium, including several instructions to enable a computer device (which may be a personal computer, server, or network device, etc.) to perform all or part of the steps of each embodiment method in the invention. The foregoing readable storage media include various media that can store program codes, such as U disk, mobile hard disk, ROM, RAM, magnetic disk, or optical disk.

It should be noted that the foregoing method embodiments for the convenience of description are described as a series of action combinations, but the technicians in the art should know that the invention is not limited by the sequence of actions described, because certain steps may be performed in other orders or simultaneously according to the invention. Secondly, the technicians in the art should also know that the embodiments described in the specification are preferred, and the actions and modules involved are not necessarily required for the invention.

In the above-mentioned embodiments, the description of each embodiment has its own emphasis. For any part not detailed in an embodiment, please refer to the relevant descriptions of other embodiments.

The vibrator vibration controlling method, the electronic device and the computer readable storage medium provided by the invention are described above. For the technicians in the art, according to the idea of the embodiments of the invention, the specific enforcement mode and the scope of application may be changed. In summary, the content of this specification should not be construed as limiting the invention.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A vibration controlling method for a vibrator, comprising steps of:
obtaining an initial voltage signal for continuously outputting an steady state voltage within an effect duration;
amplifying the steady state voltage as a startup voltage according to a preset fixed amplification factor which is more than one;
generating a first voltage signal based on the startup voltage for controlling the vibrator to accelerate vibration to a target vibration amplitude lower than a steady state vibration amplitude
attenuating the startup voltage to the steady state voltage based on a function with a monotone decreasing interval to generate a second voltage signal for controlling the vibrator to vibrate from the target vibration amplitude to the steady state vibration amplitude;
generating a steady state voltage signal based on the steady state voltage of preset continuance duration for controlling the vibrator to maintain vibration with a steady state vibration amplitude, the sum of effect duration of the first voltage signal, the second voltage signal, and the steady state voltage signal being equal to the effect duration of the initial voltage signal; and
generating a target voltage signal based on the first voltage signal, the second voltage signal, and the steady state voltage signal for controlling the vibrator to vibrate according to the target voltage signal.

2. The vibration controlling method as described in claim 1 further including steps of:
after generating the steady state voltage signal based on the steady state voltage of the preset continuance duration, determining a brake voltage based on the function with a monotone decreasing interval;
generating a third voltage signal based on the brake voltage for controlling the vibrator to decrease from the steady state vibration amplitude to zero, a direction of the brake voltage being opposite to a direction of the steady state voltage; wherein
the target voltage signal is generated based on the first voltage signal, the second voltage signal, the steady state voltage signal, and the third voltage signal.

3. The vibration controlling method as described in claim 2, wherein the step of determining the brake voltage based on the function with a monotone decreasing interval includes:
obtaining a resonance frequency of the vibrator;
determining the brake voltage whose frequency is equal to the resonance frequency of the vibrator based on the function with the monotone decreasing interval.

4. The vibration controlling method as described in claim 3, wherein the step of obtaining the resonance frequency of the vibrator includes:
driving the vibrator to vibrate by a preset frequency sweep signal;
collecting the vibration amount and voltage of the vibrator at different frequencies of the frequency sweep signal;
based on the calculation formula of the response value: $dB=20 \log(a/v)$, calculating the response values at the different frequencies respectively; where, a is the collected vibration amount, and v is the collected voltage; wherein
the frequency corresponding to the maximum response value is determined as the resonance frequency of the vibrator.

5. The vibration controlling method as described in claim 2 further including steps of:
before determination of the brake voltage based on the function with the monotone decreasing interval, generating a voltage stop signal of the preset effect duration; the voltage stop signal for controlling the vibration within the preset effect duration, the voltage output being zero; wherein the step of generating the target voltage signal based on the first voltage signal, the second voltage signal, the steady state voltage signal, and the third voltage signal includes a step of:

splicing the first voltage signal, the second voltage signal, the steady state voltage signal, the voltage stop signal, and the third voltage signal sequentially to generate a target voltage signal.

6. The vibration controlling method as described in claim 5, wherein the effect duration of the voltage stop signal is determined according to the resonance frequency of the vibrator.

7. The vibration controlling method as described in claim 6, wherein when the effect duration of the initial voltage signal is an integer multiple of 0.5, and the effect duration of the voltage stop signal is expressed as: $t_s = 0.5/f_0$, wherein the $f_0$ is the resonance frequency of the vibrator;

when the effect duration of the initial voltage signal is not an integer multiple of 0.5, the effect duration of the voltage stop signal is expressed as: $t_s = (t_g + 0.5)/f_0$; wherein, the $t_g$ is the effect duration of the initial voltage signal is divided by 0.5 decimal places, and the $f_0$ is the resonance frequency of the vibrator.

8. A control device, including:

an obtaining module for obtaining an initial voltage signal for continuously outputting a steady state voltage within the effect duration of signal;

a first generation module for amplifying the steady state voltage as a startup voltage according to a preset fixed amplification factor and generating the a voltage signal according to the startup voltage for controlling the vibrator to accelerate vibration to a target vibration amplitude lower than the steady state vibration amplitude; the value of the fixed amplification factor being more than 1;

a second generation module for attenuating the startup voltage to the steady state voltage based on the function with the monotone decreasing interval, and generating a second voltage signal for controlling the vibrator from the target vibration amplitude vibration to the steady state vibration amplitude;

a third generation module for generating the steady state voltage signal based on the steady state voltage of a preset continuance duration for controlling the vibrator to maintain vibration with the steady state vibration amplitude, a sum of the effect duration of the first voltage signal, the second voltage signal and the steady state voltage signal being equal to the effect duration of the initial voltage signal;

a control module for generating a target voltage signal based on the first voltage signal, the second voltage signal and the steady state voltage signal;

wherein the vibration is controlled according to the target voltage signal.

9. An electronic device, comprising: a memory, a processor, and a computer program stored on the memory and running on the processor when the processor executes the computer program for implements the steps described in claim 1.

* * * * *